United States Patent
Bachman et al.

(10) Patent No.: US 8,443,285 B2
(45) Date of Patent: May 14, 2013

(54) VISUAL PRESENTATION COMPOSITION

(75) Inventors: William Martin Bachman, San Jose, CA (US); Rachel A. Roth, San Francisco, CA (US); Randy Ubillos, Los Altos, CA (US); G. Garrett Groszko, Oakland, CA (US)

(73) Assignee: Apple Inc., Cupertino, CA (US)

( * ) Notice: Subject to any disclaimer, the term of this patent is extended or adjusted under 35 U.S.C. 154(b) by 269 days.

(21) Appl. No.: 12/862,558

(22) Filed: Aug. 24, 2010

(65) Prior Publication Data

US 2012/0054617 A1 Mar. 1, 2012

(51) Int. Cl.
G06F 15/00 (2006.01)
G06F 13/00 (2006.01)

(52) U.S. Cl.
USPC .......................................... 715/716; 715/723

(58) Field of Classification Search .......... 715/763–765, 715/719, 722, 725, 727–730, 732, 716, 723
See application file for complete search history.

(56) References Cited

U.S. PATENT DOCUMENTS

| | | | |
|---|---|---|---|
| 7,500,176 B2 | 3/2009 | Thomson et al. | |
| 7,512,537 B2 * | 3/2009 | Pahud et al. | 704/272 |
| 8,205,159 B2 | 6/2012 | Lee et al. | |
| 8,244,104 B2 | 8/2012 | Kashiwa | |
| 2009/0043755 A1 * | 2/2009 | Faris et al. | 707/5 |

FOREIGN PATENT DOCUMENTS

| | | |
|---|---|---|
| WO | WO0039997 A2 | 7/2000 |
| WO | WO2007104372 A1 | 9/2007 |

* cited by examiner

*Primary Examiner* — Cao "Kevin" Nguyen
(74) *Attorney, Agent, or Firm* — Schwegman Lundberg & Woessner, P.A.

(57) ABSTRACT

Methods, systems and/or computer program products that help facilitate visual presentation composition may include, in one aspect, executing one or more processes executing on a computer system to present a user of a computer system with movie templates, each movie template having a corresponding theme and a sequence of shot placeholders, each shot placeholder including graphical indicia representing one or more desirable characteristics specific to that shot placeholder; receiving information from the user including a movie template selection and a selection of one or more video clips corresponding to desirable characteristics indicated by the shot placeholders; and generating a playable media file representing a movie based on the information received from the user.

45 Claims, 9 Drawing Sheets

VISUAL PRESENTATION COMPOSITION

BACKGROUND

This description relates to systems and techniques that facilitate the composition of visual presentations, for example, movie trailers or complete movies.

Technological advances in the field of consumer digital videography equipment (e.g., digital video cameras having reduced size, increased capacity, increased resolution and/or decreased price) have caused would-be amateur movie makers to capture more video footage than ever before. Editing such voluminous footage into a presentation that is interesting, entertaining and/or informative, however, typically is not a simple task but rather tends to require more skill, experience, effort and/or creativity than most non-professionals can muster. As a result, amateur movie makers often subject family and friends to video presentations of unedited, or poorly edited, video footage that tend to be unduly long, disjointed, confusing and/or just plain boring.

SUMMARY

In general, methods, systems and/or computer program products that help facilitate visual presentation composition may include, in one aspect, methods, systems and/or computer program products that help facilitate visual presentation composition include, in one aspect, executing one or more processes executing on a computer system to present a user of a computer system with movie templates, each movie template having a corresponding theme and a sequence of shot placeholders, each shot placeholder including graphical indicia representing one or more desirable characteristics specific to that shot placeholder; receiving information from the user including a movie template selection and a selection of one or more video clips corresponding to desirable characteristics indicated by the shot placeholders; and generating a playable media file representing a movie based on the information received from the user.

Implementations can optionally include one or more of the following features. A library of video clips can be accessed. One or more video clips within the library of video clips can be identified as corresponding to at least one desirable characteristic associated with a shot placeholder. The identified one or more video clips can be identified to the user. Generating the playable media file can include generating a credits segment and including the generated credits segment in the movie represented by the playable media file. The credits segment can be at least partially generated based on user input. The credits segment can include a user-specified studio name and at least one role attributed to a user-specified cast member. Each shot placeholder can be associated with a desirable video clip length. Each theme can be associated with pre-selected background music. Each theme can be associated with one or more video clip transitions.

A plurality of studio logo styles can be presented to the user. Input indicating a studio logo style selection can be received. A studio logo that is based, at least in part, on the selected studio logo style can be included in the movie represented by the playable media file. A user input indicating at least one of, a title, a studio name, a director, or cast information can be received. A title sequence can be generated based on the received user input. The generated title sequence can be included in the movie represented by the playable media file. The title sequence can include at least a portion of one of the user selected video clips. User input indicating one or more movie awards can be received. An indication of the one or more user indicated movie awards can be included in the movie represented by the playable media file. User input indicating one or more quotes can be received. An indication of the one or more user indicated quotes can be included in the movie represented by the playable media file.

A movie poster can be automatically generated using at least one screen shot selected from the movie. The movie poster can be associated with the playable media file. Automatically generating the movie poster can include identifying a title screen for the movie, identifying a credits screen for the movie, and combining the identified title screen with the identified credits screen such that the identified title screen is positioned above the identified credits screen.

In another aspect, a user of a computer system is presented with a plurality of movie templates. Information is received from the user, including a movie template selection and a selection of one or more video clips corresponding to the selected movie template. A playable media file representing a movie is generated based on the information received from the user. A movie poster is automatically generated using at least one screen shot selected from the movie. The movie poster is associated with the playable media file, such that the movie poster is displayed within a graphic user interface for a media library that includes the movie.

Implementations can optionally include one or more of the following features. A title screen for the movie can be identified. A credits screen for the movie can be identified. The identified title screen can be combined with the identified credits screen such that the identified title screen is positioned above the identified credits screen.

Depending on implementation, the subject matter described here may provide one or more potential advantages. For example, the disclosed subject matter may be implemented as a software application that enables a user, for example, a home movie enthusiast, to quickly and easily generate a professional looking movie (and/or a movie trailer) by performing a few simple operations such as selecting a desired template, designating portions of video footage (e.g., captured by the user) to be used in the movie, and filling in some basic information (e.g., who, what, where) about the designated video footage portions and their respective contents. In addition, even prior to video footage capture or designation, a movie template may provide the user with guidance about the types and quantity of video segments that ideally should be captured and used to populate the template, thereby improving the quality of the resulting movie.

The described subject matter also may enable a user to easily and quickly generate a high quality summary or synopsis of a larger video presentation (e.g., make a movie trailer that provides a compelling and brief synopsis of a longer movie) while minimizing the level of knowledge, experience, effort and/or creativity typically required to do so.

Details of one or more implementations are set forth in the accompanying drawings and the description below. Other features and potential advantages will be apparent from the description and drawings, and from the claims.

BRIEF DESCRIPTION OF THE DRAWINGS

Like reference symbols indicate like elements throughout the specification and drawings.

DETAILED DESCRIPTION

Figure 1:
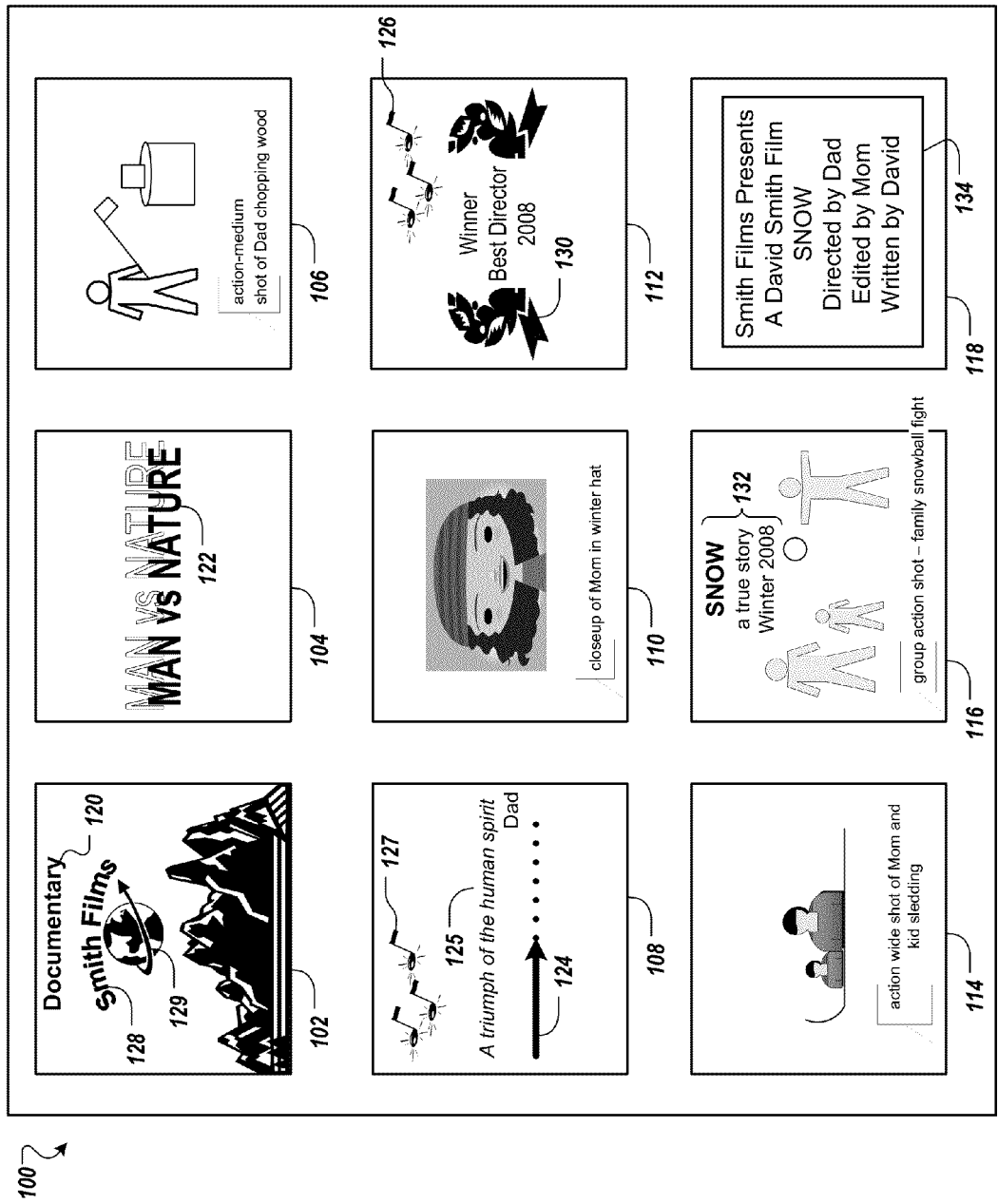
FIG. 1 shows example video clips of a generated movie.

FIG. 1 shows example video clips 102-118 displayed in sequence as content of movie 100 generated for a user in response to a user's selection and customization of a movie template. As described in more detail below, a user can customize a movie template by selecting one or more video clips to fill in one or more shot placeholders, by customizing text such as titles and subtitles, and by customizing other movie features, such as awards, credits, and studio logos, to name a few examples.

A movie template can have a corresponding theme. For example, the movie template for the movie 100 has a documentary theme, as indicated by title 120 displayed in the video clip 102. Other themes can include, for example, action adventure, blockbuster, documentary, "buddy", "chick flick", travel, epic drama, "film noir", goth, holiday, friendship, spy, pet, romantic comedy, speed, sports drama, western, horror, children's, romantic love story, super natural, and coming of age.

A movie template for a particular theme can indicate, for example, a fixed or variable cast member list. For example, a movie template with a romantic comedy theme can specify a fixed cast of two cast members and a movie template with an adventure theme can specify a variable cast of one to six cast members.

A movie template of a particular theme can also define a sequence of shot placeholders indicating an order of shots and types of shots to be selected by a user. Each shot placeholder can include graphical indicia representing one or more desirable characteristics specific to that shot placeholder. A user can select, using a user interface, one or more video clips which correspond to desirable characteristics indicated by the shot placeholders. For example, a user can select a wide scenery video clip such as shown in the video clip 102, an "action-medium" video clip such as the video clip 106, a close-up of a particular cast member such as the close-up of "Mom" shown in video clip 110, an "action-wide" video clip such as the video clip 114, or a group-action video clip such as the video clip 116.

In addition to shot order and shot type, a movie template can have other predefined specifications, such a video segment length corresponding to each shot, background music, text titles and subtitles, transitions between video clips, voice-overs and other effects. For example, background music and video clip transition can be selected for each theme. A movie template with a documentary theme, for example, can have milder music and longer video segments than, for example, a movie template with an action adventure theme.

As another example, a movie template can have text that can be customized, and the text can be shown with various effects, such as animated text 122 (e.g., the animated text 122 can flash, can grow from smaller to larger or from larger to smaller, "bounce around", etc.). As another example, graphic 124 can be animated as the video clip 108 is shown (e.g., the graphic 124 can include a horizontal line which appears to grow in size as it horizontally extends from left to right across the screen underneath quote 125). Effects used with text, graphics, and/or video can include slow motion, zoom-in, fade-to-black, or other NLE (Non-Linear Editing) effects, to name a few examples.

A movie template can include pre-defined background music that can be timed to the playing and transition of user-selected video clips. For example, the movie template used to create the movie 100 can be configured so that background music 126 plays while the video clip 112 is played and background music 127 is played while the video clip 108 is played. A user can configure a video clip so that user audio recorded during the recording of the video clip is played during the playing of the video clip in the movie 100. In some instances, the user can configure a video clip so that user audio recorded during the recording of the video clip is played in parallel with background music during the playing of the video clip in the movie 100.

A movie template can allow a user to specify a studio name and studio logo. The studio name and studio logo can be shown in a video clip of a generated movie, such as studio name 128 and studio logo 129 illustrated in the video clip 102. A movie template can allow a user to specify one or more movie awards. For example, the video clip 112 illustrates a "best director" award. A movie template can allow the user to simply enter the text title of the award, and a graphical representation of the award, which can include one or more graphics such as graphic 130, can be automatically displayed in a video segment of the generated movie (e.g., as illustrated in video clip 112).

In some implementations, user-specified text can be combined with user-selected video clips. For example, the title 120, studio name 128, and studio logo 129 can be displayed overlaid on wide-scenery video in the video clip 102. As another example, text 132 including a user-specified movie title, subtitle, season, and year can be concatenated and overlaid on group-action video displayed in the video clip 116. In some implementations, some video segments can include text (e.g., titles, subtitles) without including other video content.

The movie 100 can include a credits screen (e.g., as a last video clip), such as credits 134 illustrated in video clip 118. The credits 134 can be formatted to appear similar to credits shown in production movies (e.g., as better shown in FIG. 2). The credits 134 can include the name of a user-specified studio (e.g., the studio name 128), and can include the names of one or more user-specified cast members (e.g., "Mom", "Dad", "David Smith").

Figure 2:
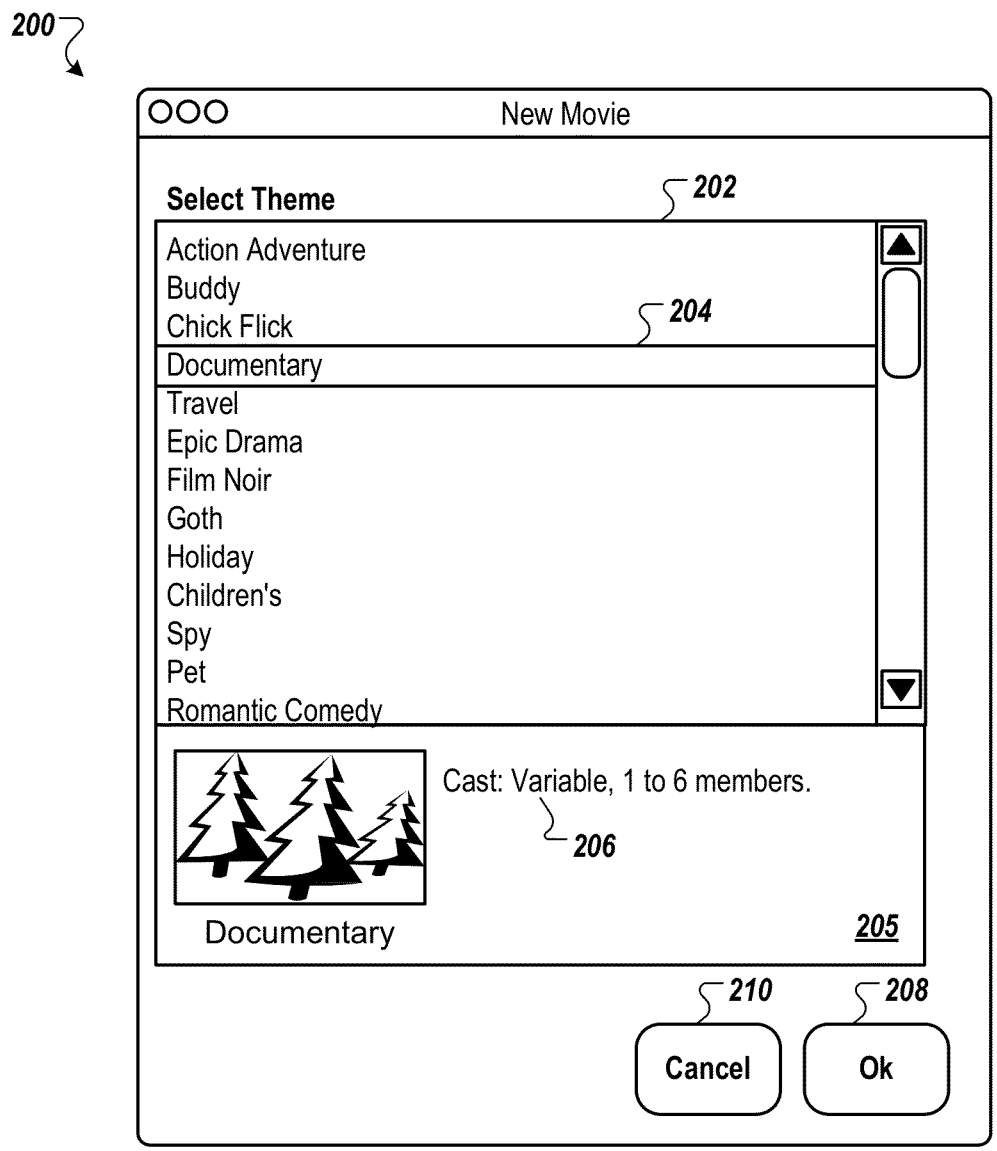
FIG. 2 is an example graphical user interface for selecting a movie template.

FIG. 2 is an example graphical user interface (GUI) 200 for creating a movie template having a particular theme. The user may select a particular theme using theme selection control 202. For example, a documentary theme can be selected, as indicated by selected item 204. Information describing the selected theme can be displayed in area 205. For example, cast information 206 can indicate that a documentary themed movie can include from one to six cast members. A user can create a movie template of the selected theme by selecting control 208. The user can cancel out of the GUI 200 without creating a movie template by selecting control 210.

Figure 3:
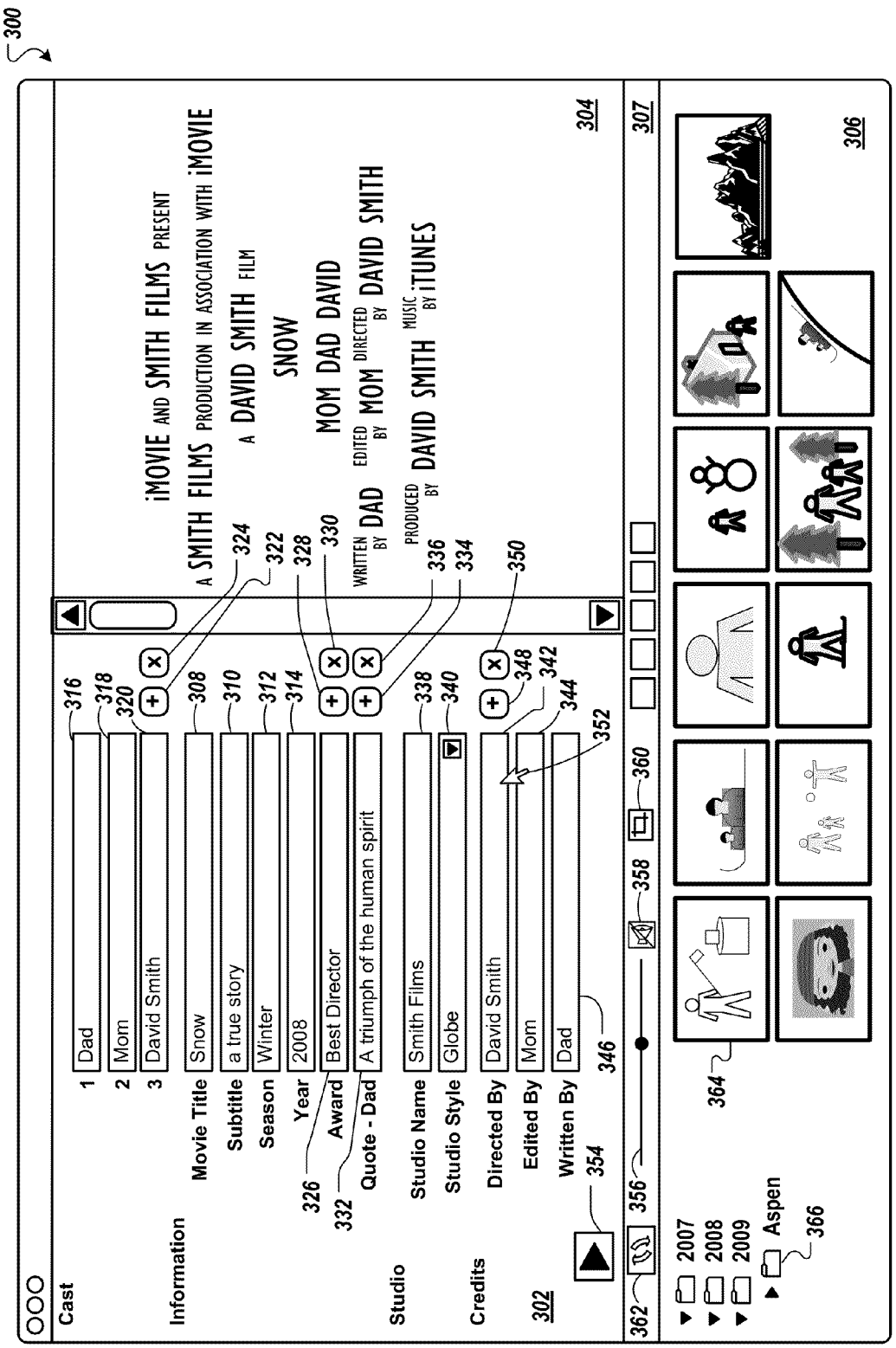
FIGS. 3-5 are examples of graphical user interfaces for customizing a movie template.

FIG. 3 is an example graphical user interface 300 for customizing a movie template. The GUI 300 includes a form area 302, a preview area 304, a user video clips area 306, and one or more control bar areas 307. The user can use the form area 302 to customize movie information. For example, a movie title and subtitle can be configured using controls 308 and 310, respectively. As another example, the season and year of the movie can be configured using controls 312 and 314, respectively. Movie title, subtitle, season, and year information can be displayed in one or more video clips of a movie generated from the movie template (e.g., as shown in the video clip 116 described above with respect to FIG. 1).

A movie can include one or more cast members. As mentioned above, movie templates for some types of themes can include a fixed number of cast members (e.g., a romantic comedy movie can include a fixed cast of two) and movie templates for other types of themes can include a variable number of cast members. A user can enter names of one or more cast members using controls 316-320. Cast member names can be displayed in one or more video clips of the generated movie, such as with one or more quotes, in a credits screen, in an awards screen, or in another video clip. A user can add or delete a cast member using controls 322 and 324, respectively.

A user can customize one or more awards for a movie. A user can enter one or more award names, such as by using control 326. Awards can include, for example, "best director", "movie of the year", "best actor", or another user-selected name. A generated movie can include an awards video clip, where the award name is displayed, possibly along with one or more graphics (e.g., as shown in video clip 112 described above with respect to FIG. 1). A user can add or delete an award using controls 328 and 330, respectively.

A user can customize one or more quotes for a movie. A user can enter the text for a quote, such as by using control 332. The user can also select control 332 to select a cast member to attribute the quote to (e.g., the quote entered in control 332 is currently attributed to "Dad"). A quote can be displayed in a video clip for a movie, such as overlaid on top of video footage, or along with a non-animated or animated graphic (e.g., as shown in video clip 108 described above with respect to FIG. 1). A user can add or delete a quote using controls 334 and 336, respectively.

A user can customize a studio name and studio logo, such as by using controls 338 and 340, respectively. The user can select a studio logo style from a list of predefined studio logo styles using the control 340. In some implementations, the list of studio logo styles includes parodies of existing movie studios. In some implementations, the user is prevented from entering the name of several popular existing movie studios. A user-entered studio name and a studio logo based on the selected studio style can be displayed in one or more video clips of the generated movie (e.g., as shown in video clip 102 and video clip 118 described above with respect to FIG. 1).

A user can customize one or more credits for a movie. For example, a user can use controls 342-344 to configure a director, editor, and writer, respectively. A user can select a cast member for a credited role or can enter in a different name. In some implementations, a cast member can be automatically assigned to a credited role. In some implementations, a user can override an automatically assigned credited role by entering a new value for the credited role. A user can add or remove a credit by using controls 348 and 350, respectively. In some implementations, to add a credit, a user selects from a predefined list of credits (e.g., directed-by, edited-by, written-by, produced-by). In other implementations, a user can enter in the name of a custom credit.

Credits may be displayed in a generated movie in a credits screen, such as shown in the video clip 118 described above with respect to FIG. 1. A credits screen can also be displayed in the preview area 304. The preview area 304 can show preview content associated with areas of the form area 302. For example, if a user moves mouse pointer 352 over one of the credit controls 342-346, a preview of a generated credits screen can be displayed in the preview area 304 (e.g., as illustrated in FIG. 3). The preview area 304 can also be used to view a preview of the generated movie. For example, the user can select play control 354 to view, in the preview area 304, a preview of a movie generated from the movie template (e.g., the video clips 102-118 described above with respect to FIG. 1 can be displayed in the preview area 304).

Other customization of movie information is possible, and customizations can vary based on the theme of the movie template. For example, a movie template having a pet theme can allow a user to select a pet type (e.g., cat, bird, dog, horse). A generated movie can include a video clip with an animated graphic of pet paw/footprints (e.g., dog paw prints, cat paw prints, or bird footprints, according to a user's template customization) "walking across the screen". As another example, movie templates of some themes can allow a user to customize a movie rating (e.g., general (G), parental-guidance (PG, PG-13), restricted (R)).

The control area 307 can include a set of controls for controlling the GUI 300. For example, the control area 307 can include, among other controls, a control 356 for adjusting playback volume, a control 358 for muting playback volume, a control 360 for selecting a portion of a user-selected video clip to use for a corresponding video segment in a generated movie, and a control 362 for switching between a view which includes the form area 302 and a view which includes a shot placeholder area.

As described in more detail below, a user can select a video clip from the video clips area 306 to fill in a shot placeholder. The video clips area 306 includes available user video clips, such as a video clip 364. The user can organize video clips using one or more folders. For example, the video clips displayed in the video clips area 306 can be video clips included in a folder 366.

Figure 4:
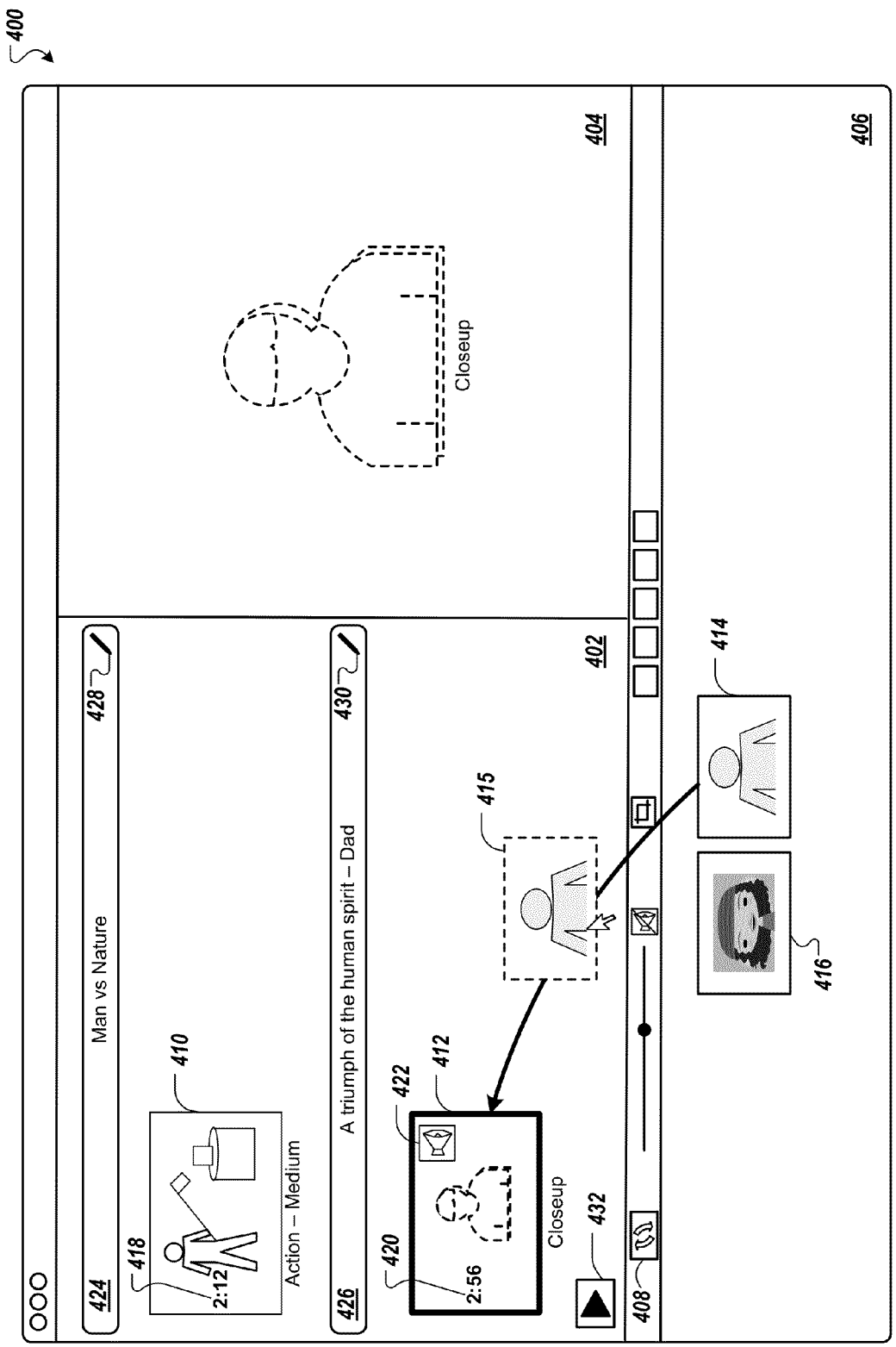

FIG. 4 is another example graphical user interface 400 for customizing a movie template. The GUI 400 includes shot placeholder area 402, preview area 404, and user video clips area 406. The user can toggle between the shot placeholder area 402 and the form area 302 described above with respect to FIG. 3, for example by selecting control 408.

The shot placeholder area 402 displays one or more shot placeholders which represent an order and type of video content to be included in the generated movie, according to the theme of the movie template. A shot placeholder that has been "filled-in" can appear differently than a shot placeholder that has not been filled in. For example, the contents of shot placeholder 410 (which represents a filled-in shot placeholder, such as filled in using the video clip 364 described above with respect to FIG. 3) appears in a solid line and the contents of shot placeholder 412 (which has not been filled in) appears in a dashed-line. The user can fill in a shot placeholder by selecting a video clip from the video clips area 406. For example, a user can select video clip 414 and can "drag and drop" a representation 415 of the video clip 414 onto the shot placeholder 412.

The video clips area 406 can be filtered to display shots which have characteristics which correspond to a selected shot placeholder. For example, selected shot placeholder 412 corresponds to a close-up shot of one cast member. Face recognition can be performed on user video clips, and video clips having a certain number of people (e.g., one) can be identified. In each video clip, the size of one or more faces relative to the size of the video clip frame can be determined, to identify a shot type (e.g., close-up, medium, wide). The video clips displayed in the video clips area 406 can be filtered to show user video clips which include the number of people and shot type associated with the selected shot placeholder. For example, the video clip area 406 includes the video clip 414 and video clip 416, which are both close-up shots of one person.

A shot placeholder can indicate a video segment length. For example, the shot placeholder 410 includes a time indicator 418 that indicates that the shot placeholder 410 corresponds to a video segment of two seconds and twelve milliseconds. Similarly, time indicator 420 indicates that the shot placeholder 412 corresponds to a video segment of two seconds and fifty six milliseconds. The time for each shot placeholder can be defined in the movie template. As mentioned above, a movie template can include timing of features such as background music, video clip transition, and effects. As described in more detail below, if a user video clip selected for a shot placeholder is longer in duration than the time specified for the shot placeholder, the user can customize the portion of the user video clip used in the generated movie.

Recorded audio of a user video clip can be muted by default in a generated movie. A shot placeholder can include a control to override the default muting of user audio. For example, a user can select control 422 to turn on audio playback of user audio associated with a user video clip selected for the shot placeholder 412.

The shot placeholder area 402 can display text items such as quotes, titles, and subtitles, and can position the text items in an order among shot placeholders corresponding to the order that the associated shots and text will appear in the generated movie. For example, a text area 424 corresponding to a movie title is displayed above the shot placeholder 410, indicating that the associated movie title will be displayed before the video clip associated with the shot placeholder 410. As another example, a text area 426 associated with a quote is included in the shot placeholder area 402 below the shot placeholder 410 and above the shot placeholder 412.

A user can edit text associated with a text area. For example, to edit the movie title associated with the text area 424, the user can select the text area 424 (e.g., by selecting the text or by selecting edit control 428). Similarly, the user can edit the quote associated with the text area 426 by selecting the text area 426 or by selecting edit control 430. Once the user has selected the text area 426, the user can select a different cast member for quote attribution.

The preview area 404 can be used to preview a video clip associated with a shot placeholder. For example, the user can select a shot placeholder (e.g., shot placeholder 410) and can select control 432. If the user selects the control 432 while a shot placeholder which has not been filled in (e.g., shot placeholder 412) is selected, an animation can be shown in the preview area 404, where the animation can be based on the shot type of the shot placeholder. For example, if the selected shot placeholder has a shot type of action, an animated character can be displayed in the preview area 404 (e.g., to emphasize a notion of action). As another example, if the selected shot placeholder has a shot type of close-up, a non-animated character can be displayed in the preview area 404. In some implementations, a user can scroll with a mouse in order to preview a title and content for a video clip.

Figure 5:
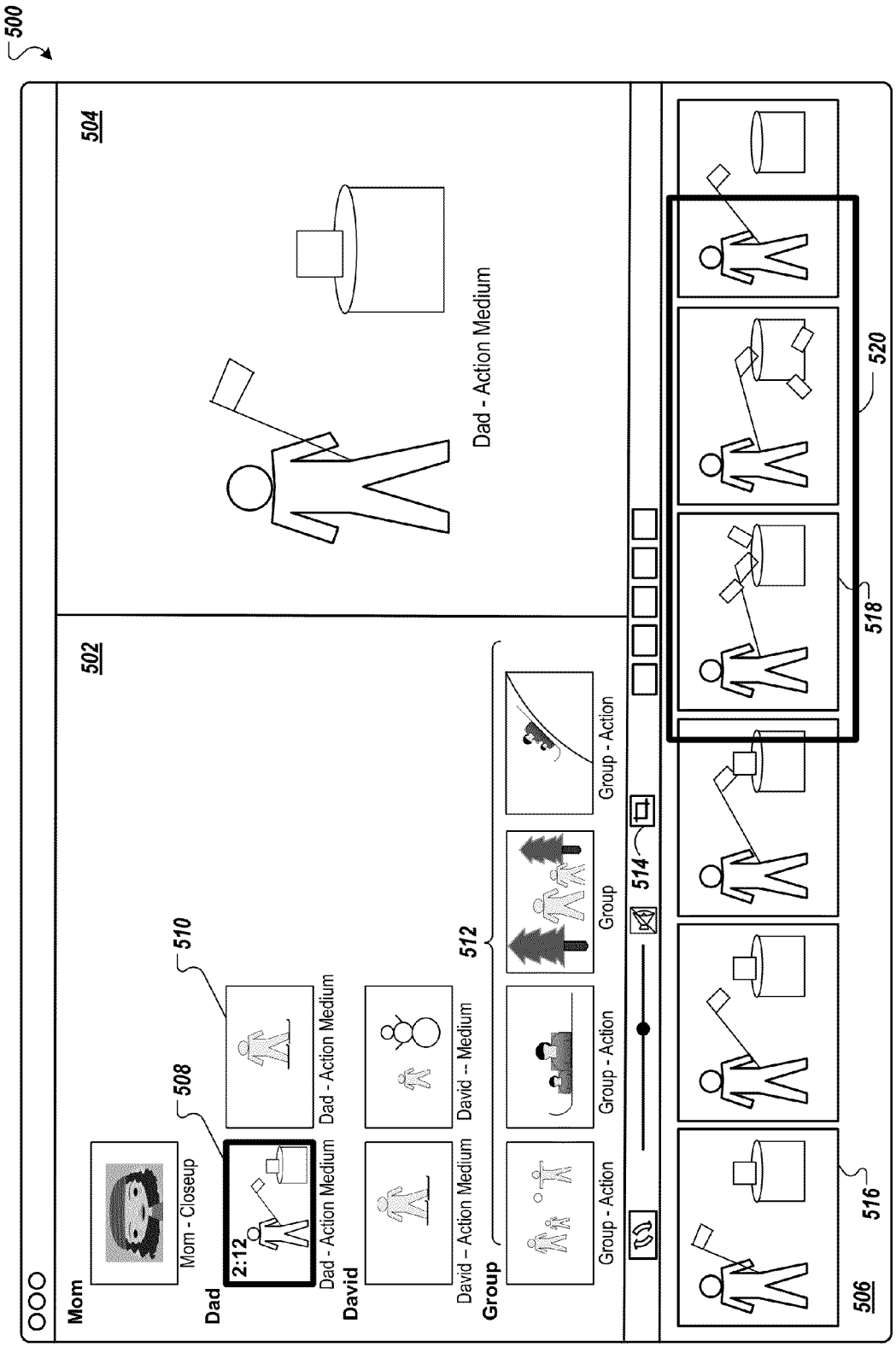

FIG. 5 is another example graphical user interface 500 for customizing a movie template. The GUI 500 includes shot placeholder area 502, preview area 504 and video clip trimming area 506. The preview area 504 can be used to display a preview of a video clip selected for a shot placeholder, such as a preview of the video clip selected for shot placeholder 508.

The shot placeholder area 502 displays a view of shot placeholders sorted by cast member. For example, shot placeholders 508 and 510 with associated video clips of "Dad" can be grouped together, and shots of other cast members similarly can be grouped by cast member. Group shots including more than one cast member can be grouped together in a bottom group 512. In some implementations, a "miscellaneous" group can include shots that do not include cast members.

As mentioned above, in some implementations, if a user video clip selected for a shot placeholder is longer in duration than the time associated with the shot placeholder, the user can customize the portion of the user video clip used in the generated movie. For example, with a shot placeholder selected, the user can select trimming control 514. In response to the selection of the trimming control 514, video frames included in the video clip associated with the selected shot placeholder, such as video frames 516 and 518, can be displayed in the video clip trimming area 506. A selection box 520 can be displayed, and can have a length corresponding to the duration of the selected shot placeholder (e.g., the length of the selection box 520 can correspond to a duration of two seconds and twelve milliseconds associated with the selected shot placeholder 508). The user can slide the selection box 520 left or right, to indicate which video frames to use for the playing of a video segment associated with the selected shot placeholder.

Figure 6:
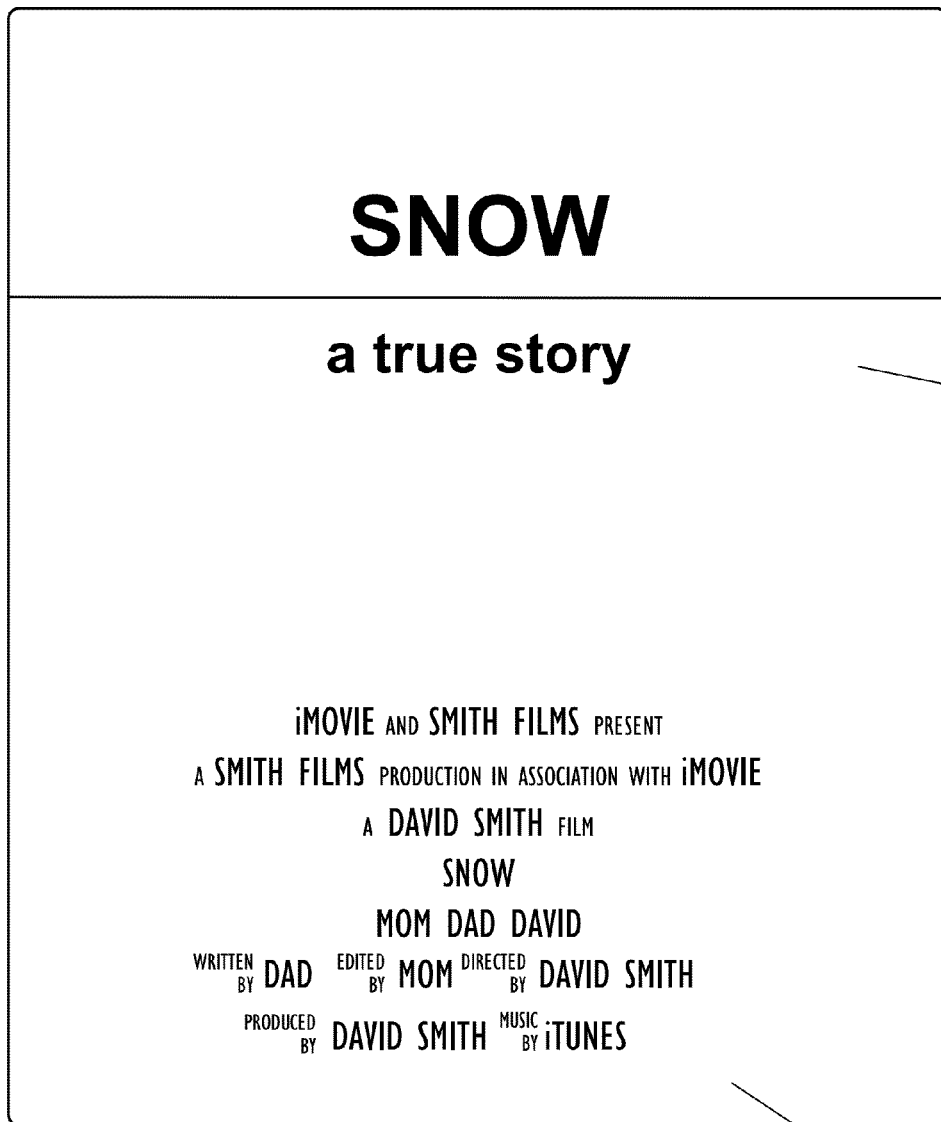
FIG. 6 shows an example of an automatically generated movie poster.

FIG. 6 shows an automatically generated movie poster 600 that can be created for a user generated movie created using movie templates as described above. The movie poster 600 can be used to represent a movie generated using movie templates within a graphic user interface (GUI) associated with a movie or media library, or within a file storage system. For example, a GUI for a media library can display various music, movie, and other video files. In some cases, the media library can include user generated media (e.g., movies created using movie templates) as well as commercial media purchased by a user. In some cases, the media library can include only user generated media. The GUI for the media library can show cover art representing various media items, such as movie or CD covers. The movie poster 600 can be automatically generated for a movie and displayed as cover art for the movie within the media library. As another example, a collection of video files can be viewed within a folder of a file system. A user can select a "thumbnail view" in order to view thumb nails of images associated with each of the video files. The automatically generated movie poster 600 can be displayed as a thumbnail image for the movie from which the movie poster 600 was generated.

In some implementations, the movie poster 600 can be generated by selecting a title screen from a title sequence of the movie. The title screen can be used as a top portion 602 of the movie poster 600. In some implementations, an appropriate title screen can be identified based on the position, time-wise, of the title screen within the movie, and/or text recognition software. In some implementations, if a movie for which the movie poster 600 was generated was created using movie templates, a title screen created using a title screen template can be identified and used as the top portion 602.

A credits screen can additionally be identified for use as a bottom portion 604 of the movie poster 600. In some implementations, an appropriate credits screen can be identified based on the position, time-wise, of the credits screen within the movie, and/or text recognition software. In some implementations, if a movie for which the movie poster 600 was generated was created using movie templates, a credits screen created using a credits screen template can be identified and used as the bottom portion 604. An identified title screen and identified credits screen can be combined to form the movie poster 600.

In some implementations, an image (e.g., a screen shot) can be selected from the movie and used as a background image for the movie poster 600. Additionally, other graphics or images can be automatically inserted into the movie poster 600. In some implementations, after the movie poster 600 is automatically generated, a user can be allowed to select an image (either from the movie, or from a collection of user images) to use as a background image for the movie poster 600. In some implementations, the user can edit portions of the text or other features of the movie poster 600. For example, the user can change the position of text or images included in the movie poster 600, or change a font for some or all of the text of the movie poster 600. In some implementations, the user can select from a library of effects or graphics that can be included in the movie poster 600.

Figure 7:
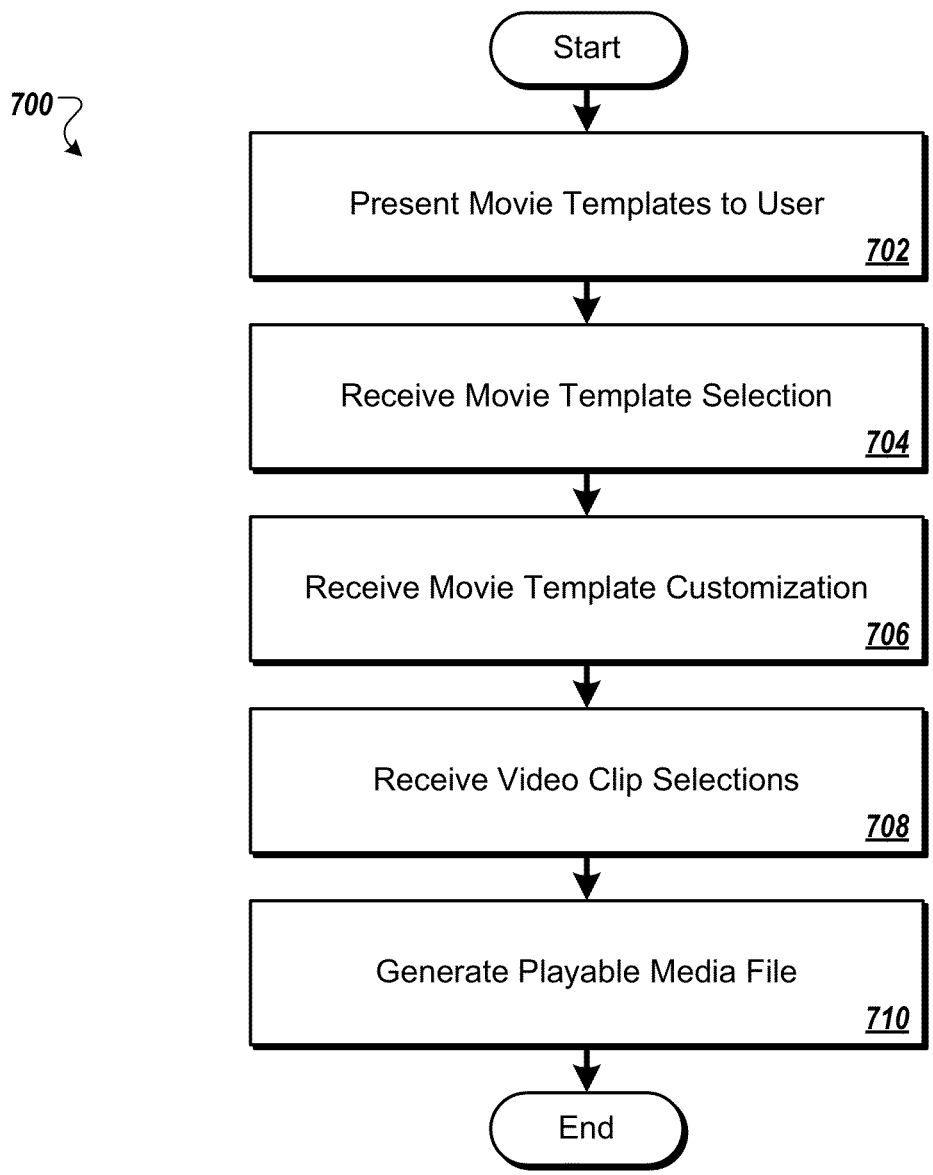
FIG. 7 is a flowchart of a process for generating a movie based on user customizations to a movie template.

FIG. 7 is a flowchart of a process 700 for generating a movie based on a movie template. The first step 702 in the process 700 is the presentation of movie templates to a user. For example, the user can be presented with a list of available movie templates, where each movie template is named according to a corresponding theme. In some implementations, the GUI 200 of FIG. 2 can be presented.

Next, at step 704, a movie template selection is received. For example, in some implementations, the user can select a movie template using the GUI 200 of FIG. 2. A movie template can include, among other settings, a sequence of shot placeholders that each includes graphical indicia representing one or more desirable characteristics specific to that shot placeholder.

In step 706, movie template customizations are received. For example, the user can, using the GUIs 300, 400, and 500 of FIGS. 3-5, customize various parameters of the movie template, such as a movie title, subtitle, season, year, studio logo and one or more cast members, quotes, awards, or credits, to name a few examples.

At step 708, video clip selections are received. For example, the user can use an interface (e.g., GUI 400 of FIG. 4) to select a user video clip for each shot placeholder. The user can also specify a portion of the user video clip to be used (e.g., using GUI 500 of FIG. 5).

In step 710, a playable media file representing a movie is generated, based on the information received from the user. The playable media file can include video segments that feature user-specified text (e.g., title, subtitle, section headings, studio name, one or more cast member names, one or more awards), as well as one or more graphical representations of awards and studio information. The playable media file can include a credits screen (e.g., as a last video clip), which can be formatted to appear similar to credits shown in production movies, and can include the name of a user-specified studio and can display roles attributed to one or more user-specified cast members.

The playable media file can include voice-overs and background music complementary to the video and timed to transitions between video clips. The playable media file can include the audio of user-selected video clips, if indicated by the user. The playable media file can also include effects (e.g., fade-to-black, zoom-in, text animation, slow-motion) automatically applied to user-specified video clips.

In some implementations, the process 700 can include more or less steps, or the steps can be performed in a different order. For example, the step 708 of receiving video clip selections can be performed before step 706 of receiving movie template customizations.

Figure 8:
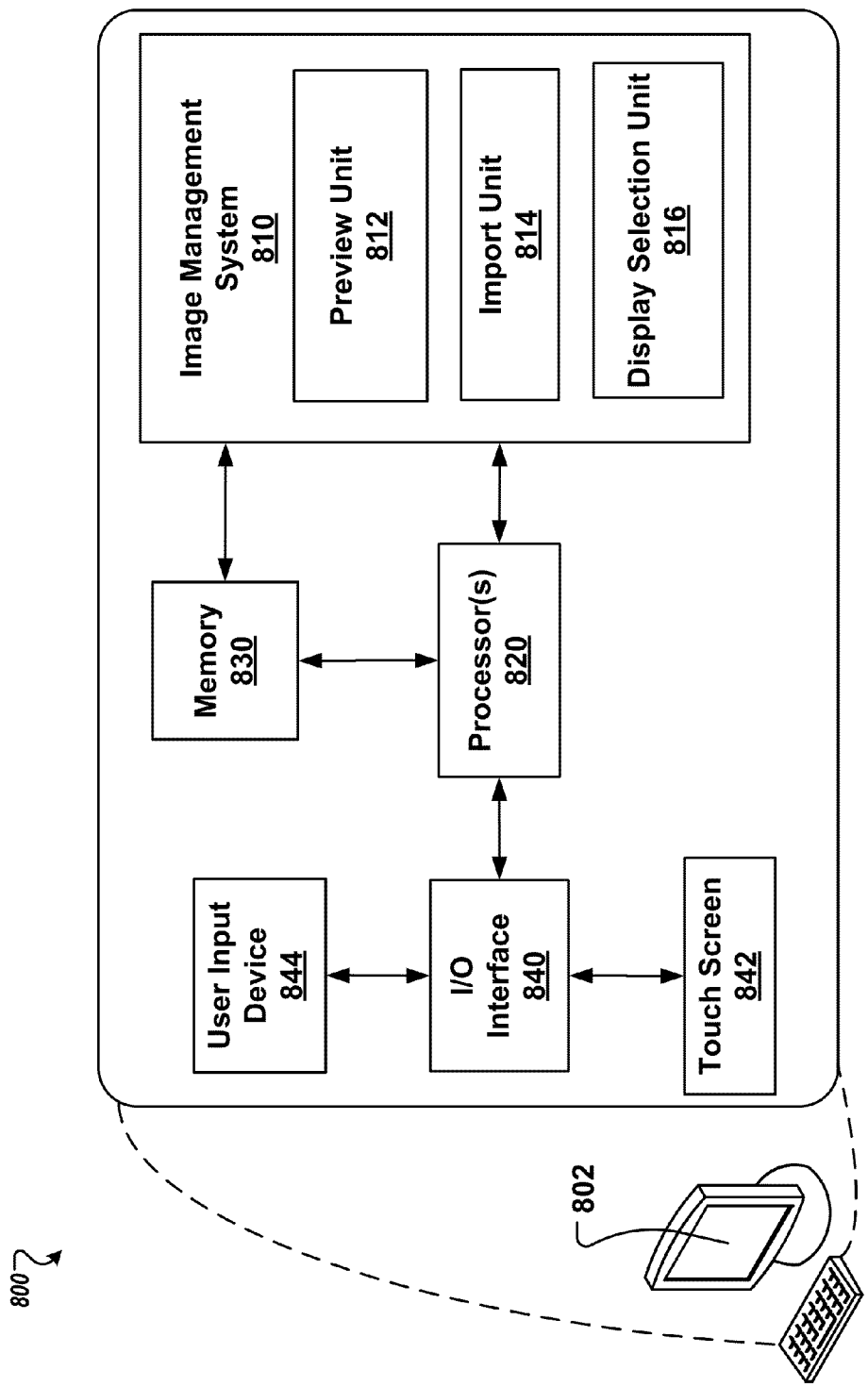
FIG. 8 is a block diagram of a computing device and system that can be used to implement techniques described with respect to FIGS. 1-6.

FIG. 8 is a block diagram of a computing device and system 800 that can be used to implement the techniques described with respect to FIGS. 1-6. The system 800 can include a processor 820 to control operation of the system 800 including executing any machine or computer readable instructions. The processor 820 can communicate with a memory or data storage unit 830 that can store data, such as image files and machine or computer readable instructions. Also, the processor 820 can communicate with an image management system 810 to manage different image files including import, export, storage, image adjustment, metadata application and display of the image files. The processor 820 can communicate with an input/output (I/O) interface 840 that can interface with different input devices, output devices or both. For example, the I/O interface 840 can interface with a touch screen 842 on a display device 802. Also, the I/O interface 840 can interface with a user input device 844 such as a keyboard, a mouse, a trackball, etc. that are designed to receive input form a user.

Figure 9:
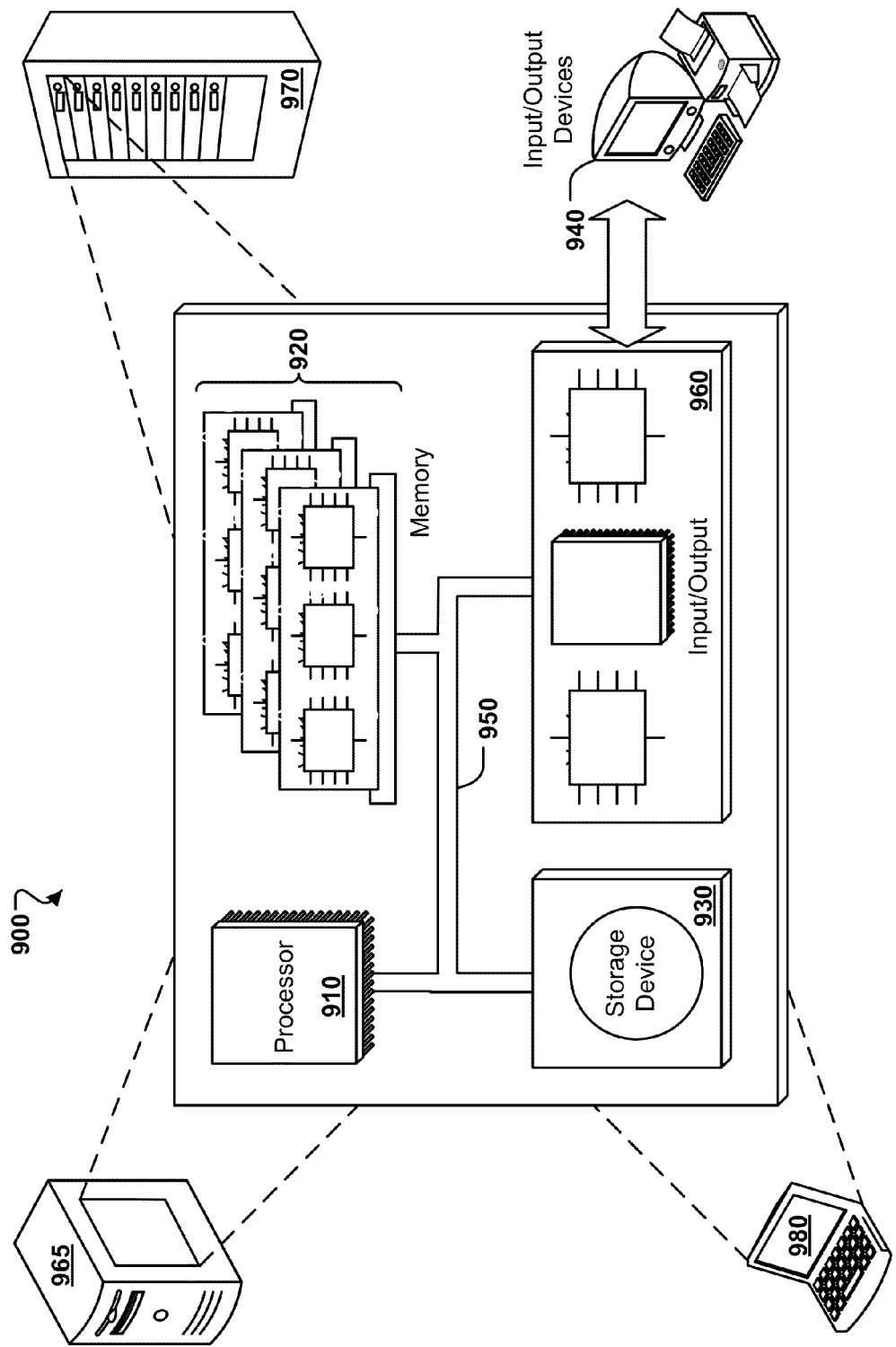
FIG. 9 is a block diagram of another computing device and system that can be used to implement techniques described with respect to FIGS. 1-6.

FIG. 9 is a block diagram of another computing device and system that can be used, e.g., to manage the display of movable elements of a user interface as described with respect to FIGS. 1-6. Computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 900 includes a processor 910, memory 920, a storage device 930, a high-speed interface 950 connecting to memory 920. The computing device can also include high-speed expansion ports (not shown), and a low speed interface (not shown) connecting to low speed bus (not shown) and storage device 930. Each of the components 910, 920, 930, 950, and 920, are interconnected using various busses, and can be mounted on a common motherboard or in other manners as appropriate. The processor 910 can process instructions for execution within the computing device 900, including instructions stored in the memory 920 or on the storage device 930 to display graphical information for a GUI on an external input/output device, such as display 940 coupled to an input/output interface 960. In other implementations, multiple processors and/or multiple buses can be used, as appropriate, along with multiple memories and types of memory. Also, multiple computing devices 900 can be connected, with each device providing portions of the necessary operations (e.g., as a server bank, a group of blade servers, or a multi-processor system).

The memory 920 stores information within the computing device 900. In one implementation, the memory 920 is a computer-readable medium. In one implementation, the memory 920 is a volatile memory unit or units. In another implementation, the memory 920 is a non-volatile memory unit or units.

The storage device 930 is capable of providing mass storage for the computing device 900. In one implementation, the storage device 930 is a computer-readable medium. In various different implementations, the storage device 930 can be a floppy disk device, a hard disk device, an optical disk device, or a tape device, a flash memory or other similar solid state memory device, or an array of devices, including devices in a storage area network or other configurations. The computer program product contains instructions that, when executed, perform one or more methods, such as those described above. The computer- or machine-readable medium can include the memory 920, the storage device 930, memory on processor 910, or a propagated signal.

The high speed controller 950 manages bandwidth-intensive operations for the computing device 900, while the low speed controller manages lower bandwidth-intensive operations. Such allocation of duties is exemplary only. In one implementation, the high-speed controller 950 is coupled to memory 920, display 940 (e.g., through a graphics processor or accelerator), and to high-speed expansion ports (not shown), which can accept various expansion cards (not shown). In the implementation, low-speed controller (not shown) is coupled to storage device 930 and low-speed expansion port (not shown). The low-speed expansion port, which can include various communication ports (e.g., USB, Bluetooth, Ethernet, wireless Ethernet), can be coupled to one or more input/output devices, such as a keyboard, a pointing device, a scanner, or a networking device such as a switch or router, e.g., through a network adapter.

The computing device 900 can be implemented in a number of different forms, as shown in the figure. For example, it can be implemented as a standard server 965, or multiple times in a group of such servers. It can also be implemented as part of a rack server system 970. In addition, it can be implemented in a personal computer such as a laptop computer 980.

Implementations of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible computer or machine readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application.

The invention claimed is:

1. A method performed by one or more processes executing on a computer system, the method comprising:
   presenting a user of the computer system with a plurality of movie templates, each movie template having a corresponding theme and a sequence of shot placeholders, each shot placeholder including graphical indicia representing one or more desirable characteristics specific to that shot placeholder;
   receiving information from the user including a movie template selection and a selection of one or more video clips corresponding to desirable characteristics indicated by the shot placeholders; and
   generating a playable media file representing a movie based on the information received from the user.

2. The method of claim 1, further comprising:
   accessing a library of video clips;
   identifying one or more video clips within the library of video clips as corresponding to at least one desirable characteristic associated with a shot placeholder; and
   indicating the identified one or more video clips to the user.

3. The method of claim 1, wherein generating the playable media file includes:
   generating a credits segment; and
   including the generated credits segment in the movie represented by the playable media file.

4. The method of claim 3, wherein the credits segment is at least partially generated based on user input.

5. The method of claim 4, wherein the credits segment includes a user-specified studio name and at least one role attributed to a user-specified cast member.

6. The method of claim 1, wherein each shot placeholder is associated with a desirable video clip length.

7. The method of claim 1, wherein each theme is associated with preselected background music.

8. The method of claim 1, wherein each theme is associated with one or more video clip transitions.

9. The method of claim 1, further comprising:
   presenting the user with a plurality of studio logo styles;
   receiving user input indicating a studio logo style selection; and
   including a studio logo that is based, at least in part, on the selected studio logo style in the movie represented by the playable media file.

10. The method of claim 1, further comprising:
    receiving user input indicating at least one of, a title, a studio name, a director, or cast information;
    generating a title sequence based on the received user input; and
    including the generated title sequence in the movie represented by the playable media file.

11. The method of claim 10, wherein the title sequence includes at least a portion of one of the user selected video clips.

12. The method of claim 1, further comprising:
    receiving user input indicating one or more movie awards; and
    including an indication of the one or more user indicated movie awards in the movie represented by the playable media file.

13. The method of claim 1, further comprising:
    receiving user input indicating one or more quotes; and
    including an indication of the one or more user indicated quotes in the movie represented by the playable media file.

14. The method of claim 1, further comprising:
    automatically generating a movie poster using at least one screen shot selected from the movie; and
    associating the movie poster with the playable media file.

15. The method of claim 14, wherein automatically generating the movie poster includes:
    identifying a title screen for the movie;
    identifying a credits screen for the movie; and
    combining the identified title screen with the identified credits screen such that the identified title screen is positioned above the identified credits screen.

16. A method performed by one or more processes executing on a computer system, the method comprising:
    presenting a user of the computer system with a plurality of movie templates;
    receiving information from the user including a movie template selection and a selection of one or more video clips corresponding to the selected movie template;
    generating a playable media file representing a movie based on the information received from the user;
    automatically generating a movie poster using at least one screen shot selected from the movie; and
    associating the movie poster with the playable media file, such that the movie poster is displayed within a graphic user interface for a media library that includes the movie.

17. The method of claim 16, wherein automatically generating the movie poster includes:
    identifying a title screen for the movie;
    identifying a credits screen for the movie; and
    combining the identified title screen with the identified credits screen such that the identified title screen is positioned above the identified credits screen.

18. A system comprising:
    a display device configured to present a plurality of movie templates, each movie template having a corresponding theme and a sequence of shot placeholders, each shot placeholder including graphical indicia representing one or more desirable characteristics specific to that shot placeholder;
    an input device configured to receive user input, the user input including a movie template selection and a selection of one or more video clips corresponding to desirable characteristics indicated by the shot placeholders; and a media file generator configured to generate a playable media file representing a movie based on the information received from the user.

19. The system of claim 18, further comprising:
a storage device for storing a library of video clips; and
a computer system executing one or more processes to perform operations comprising:
identifying one or more video clips within the library of video clips as corresponding to at least one desirable characteristic associated with a shot placeholder; and
indicating the identified one or more video clips to the user.

20. The system of claim 18, wherein the media file generator is further configured to:
generate a credits segment; and
include the generated credits segment in the movie represented by the playable media file.

21. The system of claim 20, wherein the credits segment is at least partially generated based on user input.

22. The system of claim 21, wherein the credits segment includes a user-specified studio name and at least one role attributed to a user-specified cast member.

23. The system of claim 18, wherein each shot placeholder is associated with a desirable video clip length.

24. The system of claim 18, wherein each theme is associated with preselected background music.

25. The system of claim 18, wherein each theme is associated with one or more video clip transitions.

26. The system of claim 18, wherein:
the display device is further configured to present the user with a plurality of studio logo styles;
the input device is further configured to receive user input indicating a studio logo style selection; and
the media file generator is further configured to include a studio logo that is based, at least in part, on the selected studio logo style in the movie represented by the playable media file.

27. The system of claim 18, wherein:
the input device is further configured to receive user input indicating at least one of, a title, a studio name, a director, or cast information; and
the media file generator is further configured to generate a title sequence based on the received user input and include the generated title sequence in the movie represented by the playable media file.

28. The system of claim 27, wherein the title sequence includes at least a portion of one of the user selected video clips.

29. The system of claim 18, wherein:
the input device is further configured to receive user input indicating one or more movie awards; and
the media file generator is further configured to include an indication of the one or more user indicated movie awards in the movie represented by the playable media file.

30. The system of claim 18, wherein:
the input device is further configured to receive user input indicating one or more quotes; and the media file generator is further configured to include an indication of the one or more user indicated quotes in the movie represented by the playable media file.

31. The system of claim 18, further comprising a movie poster generator configured to automatically generate a movie poster using at least one screen shot selected from the movie, and associate the movie poster with the playable media file.

32. The method of claim 31, wherein automatically generating the movie poster includes:
identifying a title screen for the movie;
identifying a credits screen for the movie; and
combining the identified title screen with the identified credits screen such that the identified title screen is positioned above the identified credits screen.

33. A non-transitory computer-readable storage medium encoded with a computer program, the program comprising instructions that when executed by data processing apparatus cause the data processing apparatus to perform operations comprising:
presenting a user of the computer system with a plurality of movie templates, each movie template having a corresponding theme and a sequence of shot placeholders, each shot placeholder including graphical indicia representing one or more desirable characteristics specific to that shot placeholder;
receiving information from the user including a movie template selection and a selection of one or more video clips corresponding to desirable characteristics indicated by the shot placeholders; and
generating a playable media file representing a movie based on the information received from the user.

34. The non-transitory computer-readable storage medium of claim 33, wherein generating the playable media file includes:
generating a credits segment; and
including the generated credits segment in the movie represented by the playable media file.

35. The non-transitory computer-readable storage medium of claim 34, wherein the credits segment is at least partially generated based on user input.

36. The non-transitory computer-readable storage medium of claim 35, wherein the credits segment includes a user-specified studio name and at least one role attributed to a user-specified cast member.

37. The non-transitory computer-readable storage medium of claim 33, wherein each shot placeholder is associated with a desirable video clip length.

38. The non-transitory computer-readable storage medium of claim 33, wherein each theme is associated with preselected background music.

39. The non-transitory computer-readable storage medium of claim 33, wherein each theme is associated with one or more video clip transitions.

40. The non-transitory computer-readable storage medium of claim 33, wherein the computer program, when executed by data processing apparatus, further causes the data processing apparatus to perform operations comprising:
presenting the user with a plurality of studio logo styles;
receiving user input indicating a studio logo style selection; and
including a studio logo that is based, at least in part, on the selected studio logo style in the movie represented by the playable media file.

41. The non-transitory computer-readable storage medium of claim 33, wherein the computer program, when executed by data processing apparatus, further causes the data processing apparatus to perform operations comprising:
receiving user input indicating at least one of, a title, a studio name, a director, or cast information;
generating a title sequence based on the received user input; and
including the generated title sequence in the movie represented by the playable media file.

42. The non-transitory computer-readable storage medium of claim 41, wherein the title sequence includes at least a portion of one of the user selected video clips.

43. The non-transitory computer-readable storage medium of claim 33, wherein the computer program, when executed by data processing apparatus, further causes the data processing apparatus to perform operations comprising:
   receiving user input indicating one or more movie awards; and
   including an indication of the one or more user indicated movie awards in the movie represented by the playable media file.

44. The non-transitory computer-readable storage medium of claim 33, wherein the computer program, when executed by data processing apparatus, further causes the data processing apparatus to perform operations comprising:
   receiving user input indicating one or more quotes; and
   including an indication of the one or more user indicated quotes in the movie represented by the playable media file.

45. The non-transitory computer-readable storage medium of claim 33, wherein the computer program, when executed by data processing apparatus, further causes the data processing apparatus to perform operations comprising:
   automatically generating a movie poster using at least one screen shot selected from the movie; and
   associating the movie poster with the playable media file.

\* \* \* \* \*